United States Patent [19]

Tieszen et al.

[11] 4,425,288

[45] Jan. 10, 1984

[54] PROCESS FOR CLEANING METAL SURFACES

[75] Inventors: Dale O. Tieszen; Jerry O. Reed, both of Bartlesville, Okla.; Gerald E. Hagler, Greenville, S.C.

[73] Assignee: Phillips Petroleum Company, Bartlesville, Okla.

[21] Appl. No.: 419,283

[22] Filed: Sep. 17, 1982

[51] Int. Cl.³ ............................................. B28B 7/04
[52] U.S. Cl. .................................. 264/39; 264/176 F
[58] Field of Search ........................ 134/7, 8, 22, 12; 264/39, 176 F

[56] References Cited

U.S. PATENT DOCUMENTS

| 2,346,228 | 4/1944 | Merrill et al. | 264/39 |
| 3,071,498 | 1/1963 | Kaskel | 134/7 |
| 3,776,774 | 12/1973 | Miller | 134/7 |
| 3,869,525 | 3/1975 | Miller | 134/7 |
| 3,895,091 | 7/1975 | Short et al. | 264/290.5 |

Primary Examiner—Jay H. Woo

[57] ABSTRACT

A process for removing poly(arylene sulfide) deposits on fiber spinning equipment parts is provided which comprises extruding a molten olefin polymer through the particular part. In the process of extrusion, the deposits are removed.

10 Claims, No Drawings

PROCESS FOR CLEANING METAL SURFACES

This invention relates to a process for cleaning metal surfaces containing poly(arylene sulfide) based deposits. In addition, this invention relates to a process for cleaning metal surfaces to remove not only poly(arylene sulfide) deposits but other contaminants as well.

In the production of poly(arylene sulfide) polymers various impurities such as polymer gel and inorganic materials are sometimes present in the polymer and can deposit on the surfaces of the production equipment. In addition, deposits derived from the polymer can also form during subsequent processing of the polymer, such as in synthetic fiber production. Thus the machine parts utilized in processing the produced polymer which have poly(arylene sulfide) deposits and/or other impurities must be cleaned for re-use. Such parts include spinnerettes, dies, pack parts, and filters.

In the past such poly(arylene sulfide) deposits have been removed mechanically, but the job is tedious and time consuming due to the complexity of the equipment. Also, attempts to remove such deposits by "burn out" procedures where the metal parts containing the deposits are placed in a forced air furnace and extreme heat applied, have been made. However, this "burn out" procedure is not suitable for removing such deposits from metal surfaces since the burn out caused corrosion on the metal surface. Therefore, a process which will readily remove such deposits without having a corrosive or other deleterious effect on processing equipment is desirable.

In addition to the poly(arylene sulfide) deposits, contaminants such as metal oxides and calcium and magnesium salts form on the metal surfaces. Their removal is also desirable in order to give a clean metal surface.

It is therefore an object of this invention to provide a process for removing deposits derived from poly(arylene sulfides) from metal surfaces. It is a further object of this invention to provide a process for the cleaning of metal parts having poly(arylene sulfide) deposits thereon.

Other aspects, objects and the several advantages of the present invention will be apparent from this specification and the claims.

In accordance with the present invention, it has been discovered that poly(arylene sulfide) deposits on the metal surface of fiber spinning equipment parts can be removed by extruding at least one molten olefin polymer having from 2 to 6 carbon atoms through said parts.

In accordance with another embodiment of this invention, in a process for the production of poly(arylene sulfide) fibers wherein poly(arylene sulfide) deposits form on the surfaces of at least one spinning equipment part that such deposits can be removed by (a) removing the part having poly(arylene sulfide) deposits thereon; (b) attaching the part to an extruder for an olefin polymer; and (c) extruding at least one molten olefin polymer having from 2 to 6 carbon atoms through said part whereby said deposits on said part are removed.

In carrying out the process of this invention, at least one molten olefin polymer containing 2 to 6 carbon atoms is extruded through spinning equipment parts having poly(arylene sulfide) deposits thereon. In the process of the extrusion, the deposits are removed. In a preferred embodiment of the invention, polypropylene or polyethylene are extruded through the part containing the poly(arylene sulfide) derived deposits.

Suitable polypropylene and polyethylene olefin polymers for use in the process of this invention are those having the following physical properties:

| Olefin | Melt Flow General | Melt Flow Preferred | Text Method |
|---|---|---|---|
| polypropylene | .04 to 4 | 1 to 2 | ASTM D 1238 (230 C/2160 grams) |
| polyethylene | .1 to 4 | 1 to 2 | ASTM D 1238 (190 C/2160 grams) |

When extruded through the spinning equipment parts, the particular olefin should be in a molten state. This means that the olefin has been subjected to a temperature near its melting point such that the olefin will flow.

The invention is applicable for use with any normally solid heat-curable, high molecular weight arylene sulfide polymer such as those that can be formed into fibers. Arylene sulfide polymers which are normally encountered in the process of this invention include arylene sulfide polymers which have a melt flow of at least about 20 and generally within the range of about 50 to about 400 and higher (determined by the method of ASTM D 1238-70, modified to a temperature of 316° C. using a 5-kg weight, the value being expressed as g/10 min.). Thus, the arylene sulfide polymers can be linear, branched, or tightly crosslinked. The polymer employed in the process can be prepared by use of polyhaloaromatic compounds, alkali metal sulfides, and organic amides as described and disclosed in U.S. Pat. No. 3,354,129. Polymer can also be made a process which gives low melt flow high molecular weight material compared by use of a p-dihalobenzene and alkali metal sulfide and organic amide and an alkali metal carboxylate as in U.S. Pat. No. 3,919,177.

Spinning equipment parts which are envisioned for use in the process of this invention include but are not limited to spinnerettes, screen-pack parts, filters, orfices and dies, and the like.

In another embodiment of this invention, in spinning equipment having at least one part with poly(arylene sulfide) deposits thereon, the part is removed from the equipment and attached to an extruder for an olefin, preferably polyethylene or polypropylene as described above. The olefin can then be heated to its molten state and extruded through the particular spinning equipment part. Such parts which can be cleaned by this process are spinerettes, screen-pack parts, dies, or filters. By removing each part individually, the fiber production process can be operated continuously without having to shut it down for any length of time.

The following example illustrates the present invention.

EXAMPLE I

A polyphenylene sulfide polymer (PPS) having a melt flow between 200 and 400 as measured at 315 C./5 Kg (Ryton D, U.S. Pat. No. 3,919,177) was extruded at 300 C. through a fiber spin-pack assembly comprised of a 60/100/200/325 mesh screen combination and a 2.25 inch diameter 18-hole spinnerette (holes 0.023 inches length by 0.009 inch diameter), after about 30 minutes, the spinning was stopped and the spin-pack removed. Excess PPS was wiped off and the spin-pack removed. Excess PPS was wiped off and the spin-pack heated in an oven at 300 C. for 15 minutes while the extruder was emptied of PPS. Polypropylene (melt flow 2 as measured at 230 C./2160 grams and described in test method ASTM D 1238, was passed through the extruder to flush out PPS. The spin-pack was reassembled in the extruder and polypropylene extruded for about 15 to 30 minutes at 330 C. (626 F.). All the holes of the spinnerette were opened. The spinnerette was removed from the extruder and heated in an oven at 427 C. (800 F.) for 3 hours to completely remove the polypropylene. Microscopic inspection of the spinnerette holes showed no corrosion. When the procedure was conducted with a higher melt flow polypropylene (i.e. 4) only 12 of the 18 holes were cleared which suggests the invention works best with a polypropylene having a melt flow less than 4. Cleaning the spin-pack by a commonly used burn-off treatment at 427 C. to 538 C. (800 F. to 1000 F.) results in reasonably clean surfaces but also in severe corrosion particularly to the screen filters. As a result, such screen filters can only be used 2 or 3 times before discarding.

Reasonable variation and modifications are possible in the scope of the foregoing disclosure and the appended claims.

We claim:

1. A process for the removal of poly(arylene sulfide) deposits from the surfaces of fiber spinning equipment parts which comprises extruding at least one molten olefin polymer having from 2 to 6 carbon atoms through said parts.

2. A process according to claim 1 wherein said poly(arylene sulfide) is poly(phenylene sulfide).

3. A process according to claim 1 wherein said molten olefin is polyethylene.

4. A process according to claim 1 wherein said molten olefin is polypropylene.

5. A process according to claim 1 wherein said part is a spinnerette.

6. In a process for the production of poly(arylene sulfide) fibers wherein poly(arylene sulfide) deposits form on the surfaces of at least one spinning equipment part, the improvement which comprises:
    (a) removing the part having poly(arylene sulfide) deposits thereon;
    (b) attaching said part to an extruder for olefin polymer; and
    (c) extruding at least one molten olefin polymer having from 2 to 6 carbon atoms through said part thereby removing said deposits on said part.

7. A process according to claim 6 wherein said poly(arylene sulfide) is poly(phenylene sulfide).

8. A process according to claim 6 wherein said molten olefin is polyethylene.

9. A process according to claim 6 wherein said molten olefin is polypropylene.

10. A process according to claim 6 wherein said part is a spinerette.

* * * * *